US00RE46240E

(19) United States
(12) Reissued Patent
Schau

(10) Patent Number: US RE46,240 E
(45) Date of Reissued Patent: Dec. 20, 2016

(54) HINGE CAP

(71) Applicant: Select Products Ltd., Portage, MI (US)

(72) Inventor: Timothy Alan Schau, Portage, MI (US)

(73) Assignee: Select Products Ltd., Portage, MI (US)

(21) Appl. No.: 14/992,318

(22) Filed: Jan. 11, 2016

Related U.S. Patent Documents

Reissue of:
(64) Patent No.: 8,898,861
Issued: Dec. 2, 2014
Appl. No.: 12/804,170
Filed: Jul. 15, 2010

U.S. Applications:
(60) Provisional application No. 61/231,249, filed on Aug. 4, 2009.

(51) Int. Cl.
*E05D 11/00* (2006.01)

(52) U.S. Cl.
CPC ..... *E05D 11/0054* (2013.01); *E05Y 2900/132* (2013.01); *Y10T 16/533* (2015.01); *Y10T 16/61* (2015.01)

(58) Field of Classification Search
CPC .. E05F 7/00; E05Y 2201/10; E05Y 2800/352; E05Y 2800/424; E05D 11/0054
USPC ..... 16/223, 250
See application file for complete search history.

(56) References Cited

U.S. PATENT DOCUMENTS 158,237 A * 12/1874 Blake ..... E05D 11/0054 16/251
310,637 A * 1/1885 Barnekow ..... 16/250
2,047,909 A * 7/1936 North ..... 16/250
2,585,836 A * 2/1952 Quigley ..... 16/250
3,229,323 A * 1/1966 Hensgen ..... 16/247
3,252,179 A * 5/1966 Watson ..... E05D 11/0054 16/250
3,431,590 A * 3/1969 Anderson ..... 16/223
4,240,225 A * 12/1980 Sartain ..... E05F 7/00 248/345.1
4,411,045 A * 10/1983 Rock et al. ..... 16/243
4,713,922 A * 12/1987 Ingold ..... E06B 1/6069 254/104
5,680,675 A * 10/1997 Davis ..... E05C 17/025 16/83
5,911,264 A * 6/1999 Smrke et al. ..... E05D 7/1077 16/258
7,536,747 B2 * 5/2009 Christeson et al. ..... 16/247
7,650,670 B2 * 1/2010 Baer et al. ..... 16/236
2004/0154129 A1 * 8/2004 Martinez-Munoz E05D 11/0054 16/250

(Continued)

OTHER PUBLICATIONS

Photograph that is representative of an angle-cut tip for a continuous geared hinge that was publicly used or on sale more than one (1) year prior to the filing date of U.S. Appl. No. 61/231,249, filed Aug. 4, 2009.

*Primary Examiner* — Joseph Kaufman
(74) *Attorney, Agent, or Firm* — Gardner, Linn, Burkhart & Flory, LLP

(57) ABSTRACT

A product and a method employing a block having a downwardly angled front surface suitable for covering the top surface of a continuous geared door hinge after the door is installed in a frame. The block has one or more recessed counter bored holes in the front surface to accommodate security screws without compromising the angle of the front surface.

10 Claims, 3 Drawing Sheets

(56) References Cited

U.S. PATENT DOCUMENTS

2007/0261201 A1* 11/2007 Baer et al. ..... E05D 3/122
16/236

* cited by examiner

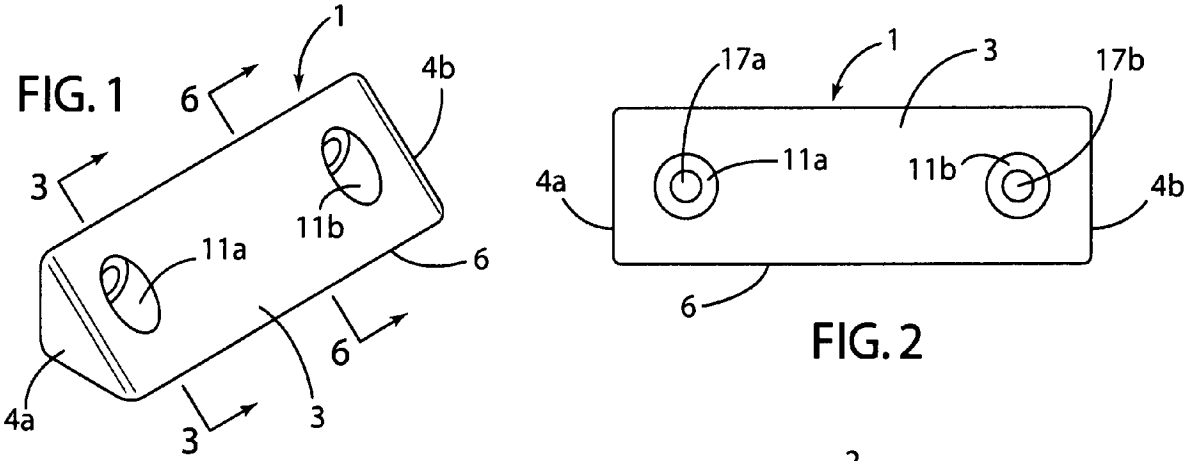
FIG. 1
FIG. 2
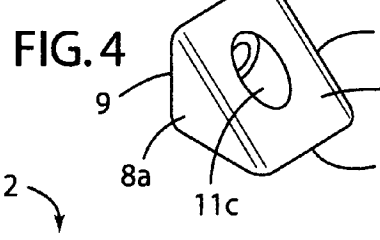
FIG. 3
FIG. 4
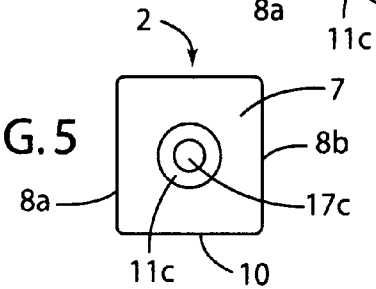
FIG. 5
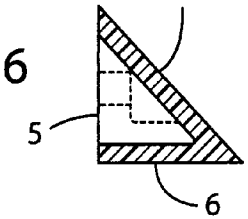
FIG. 6

HINGE CAP

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This application claims the benefit under 34 U.S.C. 119(c) of provisional application No. 61/231,249 filed Aug. 4, 2009 entitled "A STEEPLY ANGLED BLOCK TO DETER HANGING OBJECTS FROM A DOOR HINGE BARREL OR COVER".

BACKGROUND OF THE INVENTION

Door hinges are primarily designed to facilitate opening, closing and securing the door. To the extent safety or security is a concern, both the patent literature and hinge manufacturers focus on preventing fingers from being caught between the door and the jamb or preventing entry by unwanted intruders into areas partially protected by doors. In psychiatric wards and criminal detention facilities hinges are also designed to prevent exiting out of the doors.

Much to the dismay of hinge manufacturers humans find ways to use hinges for other than their intended uses, for example, by hanging objects or abusing themselves on protruding surfaces of the hinges. Such uses can lead to unhinging the door from the frame to which the door is attached or, more surprisingly, to injury or death, particularly to inmates of institutions like prisons or mental hospitals where more irrational persons are housed. For example, if a person hangs a gym bag from the top of a hinge and the door is opened with excess pressure to its maximum swing, the bag can act as a fulcrum to pry the hinge and the door loose from the frame to which it is attached. Likewise in prisons and mental institutions inmates have been known to hang or abuse themselves from the protruding surfaces of hinges. These are not theoretical possibilities. They have occurred in sufficient numbers to become a major concern of those who manage such institutions and therefore of hinge manufacturers. Like all serious problems, the challenge is always to find a solution that is both practical and economical. In this case where misbehavior is involved, the first reaction would be to take steps to change the behavior, always difficult to do. The genius of present invention is that it provides such a solution that meets legal requirements.

SUMMARY OF THE INVENTION

It is an object of the present invention to provide a practical economical solution to a serious problem associated with misuse of the top surface of continuous geared door hinges. It is a further object of the present invention to provide a means and a method for covering or overlaying the top surface of a continuous geared door hinge to prevent hanging objects on the hinge as well as to prevent individuals from using the hinge for abusive purposes.

The present invention accomplishes these purposes and makes rooms safer while meeting legal requirements by retrofitting door hinges to deter patients or inmates from harming themselves by using the top of the hinge to hang or abuse themselves. It also helps to prevent the accidental prying of the hinge and door from the frame when objects are hung from the hinge.

The present invention comprises a means and a method including a five sided block for mounting on a frame for a door, the block having a downwardly angled front side, a back side, a bottom side and two ends, said back and bottom sides being substantially at right angles to each other, said bottom side being shaped and sized to cover an exposed top surface of an installed continuous geared door hinge, said ends being triangular in cross section, said front surface having at least one counterbored hole that extends from the front side to the back side and is suitable for mounting said block on the surface of a frame for the door using a security type screw having a head that can be recessed far enough into the larger portion of the counterbored hole on the front side to avoid interfering with the downwardly angled front side. The said block is preferably constructed using a hard durable material such as plastic, metal or fiberglass to minimize tampering or destruction. The said block preferably has one counterbored hole for attachment to the frame over an installed door hinge with a narrow top surface (such as a mortise type continuous geared hinge) and having two counterbored holes for attachment to the frame over an installed door hinge with a wide top surface (such as a full surface continuous geared hinge). The angle of the front surface should be steep, preferably from about 40% to about 50% measured from the plane of the bottom side. The head of the screw used to attach the block is preferably configured to require a special tool to tighten or remove the screw. The said block preferably has rounded edges to the extent they are exposed after installation to minimize possible abuse. Using the security screws the blocks are attached to the frame of a door just over the position occupied by the top surface of an installed hinge when the door is closed leaving no part of the top surface exposed. Some overlap over the top surface of the hinge is permissible if the exposed edges of the block are rounded. The present invention includes a method of deterring a person from hanging objects or abusing him or herself on the exposed top surface of a continuous geared door hinge installed on a door, the method comprising the step of affixing a block that is shaped, sized and positioned on a door frame so as to overlay the top surface of the hinge when the door is closed without providing an exposed surface that has sharp edges or permits a person to hang objects from the block.

Continuous geared hinges are essentially of two types: a full surface hinge and a mortise type hinge. The two leaves of the former are fully exposed after installation on the surface of the door and its frame as depicted in FIG. 7. After installation only the cover over the geared portion of the latter is exposed between a closed door and its frame as depicted in FIG. 8.

A full surface hinge has a substantially flat top surface that is wider than other hinges since the top surfaces of the leaves as well as the covered geared portion of the hinge are exposed after installation on the door and its frame. A block that is wide enough to cover that surface would preferably have two openings for security screws. The top surface of the hinge is not completely planar since there are substantial openings in the surface. The alternative of simply shaping the top of the hinge to produce a downward angle would discourage or prevent hanging objects on the hinge, but the resulting surfaces would include sharp edges in the various components of the hinge, namely the covers and the meshed gears. Such edges are typical of objects that have in fact provided tempting surfaces to patients or inmates bent on abusing themselves. The block of the present invention is therefore a more satisfactory solution to the problem both on newly manufactured and already installed hinges.

After the leaves of a full mortise type continuous geared door hinge are attached to a door and frame only the fulcrum or covered geared portion of the hinge is exposed when the door is closed and provides a substantially flat top that is narrower than that of an installed full surface hinge. For that reason it is a more tempting surface to hang objects. An opening in the angled surface of the block for one security screw would be sufficient for attachment of the block to the frame of the door.

An alternative to the block of the present invention to solve this problem would be cutting an angle at the top of a newly manufactured mortise type continuous geared door hinge and adding a fixed cover to that surface. However the block of the present invention would still be useful for existing or newly manufactured continuous geared hinges that for whatever reason, including cost considerations, are not configured with a downward angle on top.

The block of the present invention can be machined, molded, extruded or forged to produce the desired shapes. Molding using a plastic material is preferred for overall economy.

The words "block" and "cap" are used interchangeably throughout this specification to describe the present invention. "Block" is more descriptive of the structure of the invention while "cap" is more descriptive of its function.

BRIEF DESCRIPTION OF DRAWINGS

FIG. 1 is a perspective view of one embodiment of the block suitable for attachment to a full surface hinge.

FIG. 2 is a front view of the block shown in FIG. 1.

FIG. 3 is sectional view taken along lines 3-3 of FIG. 1.

FIG. 4 is a perspective view of a second embodiment of the block suitable for attachment to a full mortise type continuous geared door hinge.

FIG. 5 is a front view of the block shown in FIG. 4.

FIG. 6 is a sectional view taken along lines 6-6 of FIG. 1.

LIST OF REFERENCE NUMERALS

Figure 7:
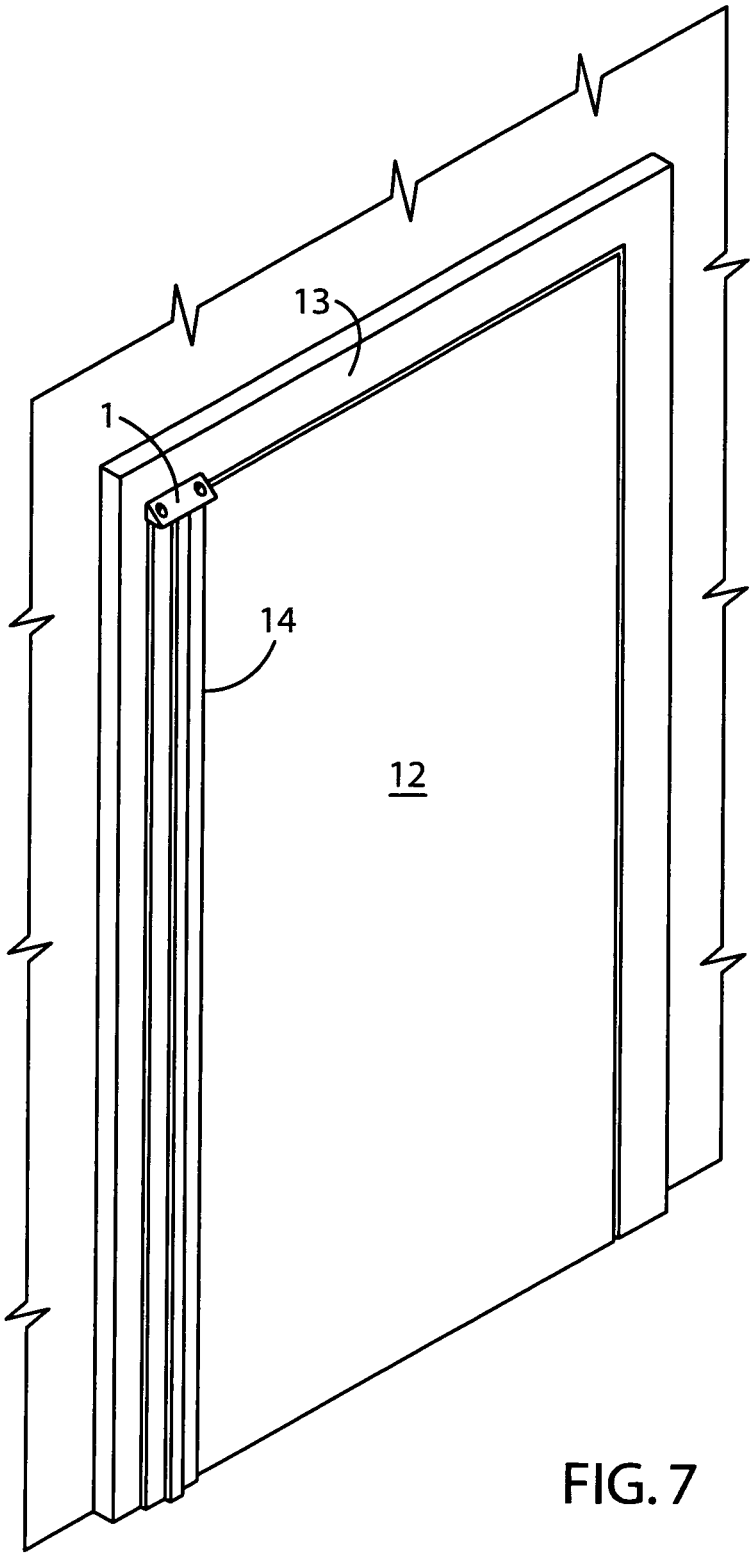
FIG. 7 depicts the first embodiment of the block after installation on a continuous geared full surface hinge.

1 Full surface hinge cap
2 Mortise type hinge cap
3 Front surface of full surface hinge cap
4a, 4b Ends of full surface hinge cap
5 Back surface of full surface hinge cap
6 Bottom surface of full surface hinge cap
7 Front surface of mortise type hinge cap
8a, 8b Ends of mortise type hinge cap
9 Back surface of mortise type hinge cap
10 Bottom surface of mortise type hinge cap
11a, 11b, 11c Larger portion of the counterbored openings for security screws
12 Door
13 Door frame
14 Full surface hinge
15 Mortise type hinge
17a, 17b, 17c Smaller portion of the counterbored openings for security screws

DETAILED DESCRIPTION

The preferred embodiments of the product of the present invention consist of the versions of the block best shown in FIGS. 1 and 4.

The essential components of the above embodiments 1,2 of the block include:

(1) A downward sloping front side 3,7, (2) A bottom surface 6,10 adapted for covering the unobstructed top surface of a continuous geared hinge, (3) A back side 5,9 perpendicular to the bottom side 6,10 and (4) At least one counterbored hole extending from the front side 3,7 through the back side 5,9 adapted for mounting the block 1,2 to a frame 13 for a door 12 with a security type screw (not shown) without obstructing the slope of the front side 3,7.

The block 1,2 can be machined, molded, extruded or forged to shape using conventional manufacturing techniques. A molded plastic version of the block 1,2 is preferred because of ease and economy of manufacture. The preferred plastic material is a polyester resin such as VALOX 310 SEO, a polybutylene resin, because of the combination of hardness, durability, availability and cost. The preferred slope is about 45 degrees measured from the bottom surface 6,10. The preferred bottom surface 6,10 for both versions of the block 1,2 is planar. The exposed surfaces of the block should be smooth and the exposed edges of the block should be rounded.

FIGS. 1-3 and 6 depict the preferred version of the block 1 intended for use on a full surface hinge 14. This block 1 is 3.312 inches long, 1 inch high and 1 inch deep at the bottom surface 6 and would cover the top of most existing full surface hinges. The slope of the front side is 45 degrees. Some overlap is permissible and exposed edges are preferably rounded to minimize the possibility of abuse. The bottom 6 and back 5 sides are perpendicular to each other. The bottom surface 6 is planar. The two counterbored openings for 225 security screws (not shown) are centered at ½ inch from each end 4a,4b and the bottom side 6 and have a larger portion 11a,11b with a diameter of 0.437 inches. The openings 17a,17b for the shaft of the screws are 0.221 inches in diameter.

FIGS. 4-5 depict a version of the block 2 that is suitable for use on full mortise type continuous geared hinge 15. Cross section views depicted in FIGS. 3 and 6 are also suitable for depicting cross sectional views of the version of the block 2 depicted in FIGS. 4-5. This version is only one inch from end 8a to end 8b with the back 9 and bottom 10 sides being one inch from top to bottom and front to back. The larger portion of the counterbored opening 11c for the single security screw (not shown) is the same in size and location from the triangular ends 8a,8b of the block 2 as the larger openings 11a,11b for the full surface version of the block 1. Except for size and the presence of a single recessed opening for a security screw it 2 is identical to the version depicted in FIGS. 1-3.

Figure 8:
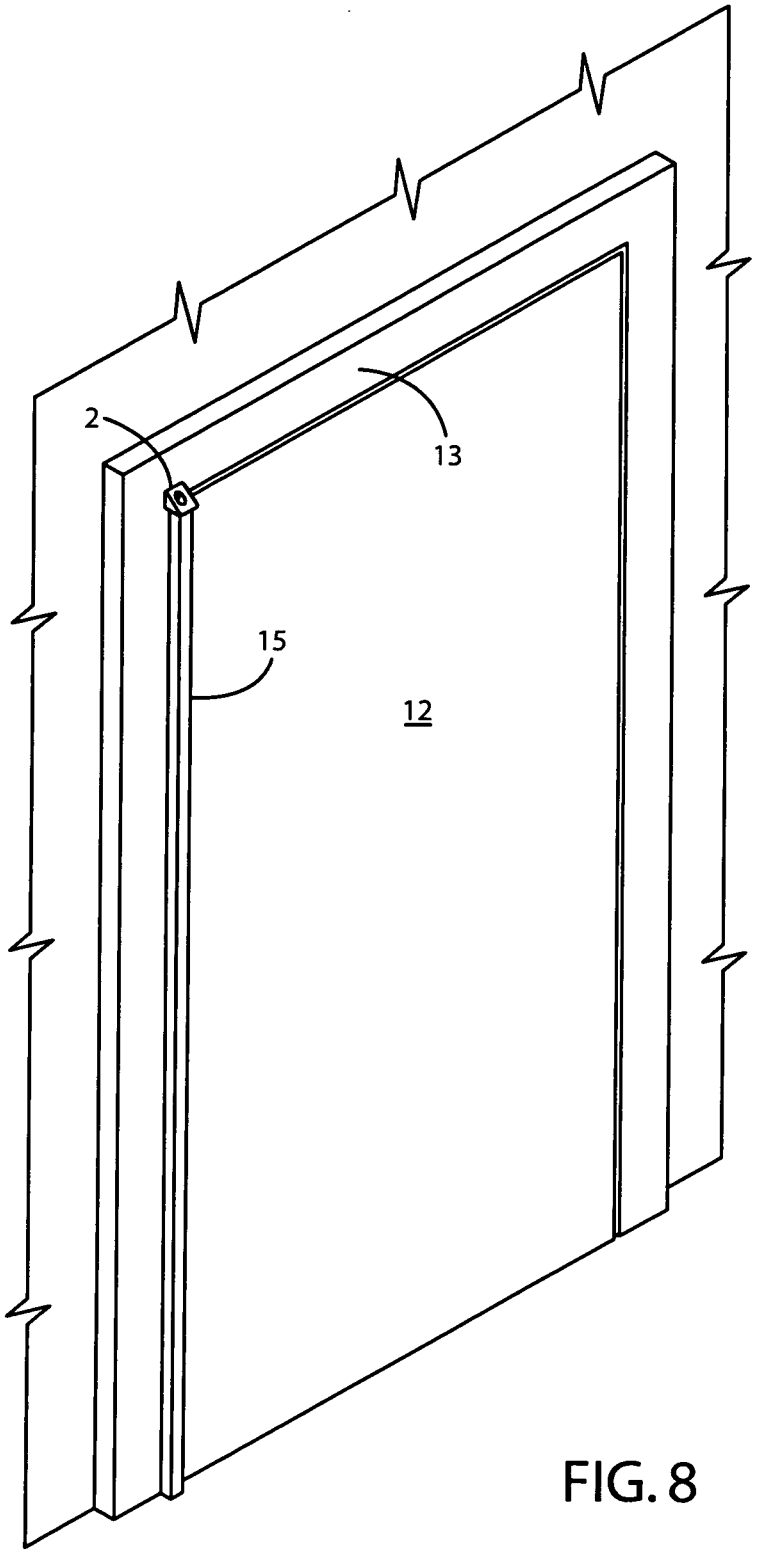
FIG. 8 depicts the second embodiment of the block after installation on a full mortise type continuous geared hinge.

FIGS. 7-8 depict the two versions of the block 1,2 after attachment on the frames 13 for the doors 12 on which the hinges 14,15 are installed.

The block of the present invention when attached to a frame for a door to cover the top surface of the door hinge is designed to deter a person from hanging anything or abusing him or herself from the top of the door hinge. To prevent an unauthorized person from detaching the block once installed, it must be installed using a security type screw, namely a screw that has a head that requires a special tool for fastening and unfastening the screw. An example of misuse of the uncapped version of a hinge is a student's use of the hinge to hang a gym bag containing a basketball or a comparable object from the top surface of the hinge. The object can act as a fulcrum to pry the hinge and door loose from the frame if sufficient force is applied when someone opens the door. Another example involves institutions where inmates or patients have hung or abused themselves from the top of a door hinge. The alternative to the present invention of machining the top surface of installed hinges would require removal of the door and hinge from the door opening and machining a steep angle on the top of the hinge, which may still result in sharp edges that can provide patients or inmates with a way of abusing themselves. The present invention provides a simpler and more cost effective alternative, namely positioning the angled block on the door frame using one or two security screws to cover the top surface of the hinge when the door is closed.

The specifications disclosed herein for the various components of the preferred versions of the present invention and associated doors and their frames are illustrative of the present invention but are not critical.

The present invention has been described in its preferred embodiments that are not intended to be limiting. Various alterations and modifications will become readily apparent to those skilled in the art after reading the present disclosure. The scope of the present invention should therefore be limited only by the scope of the appended claims.

The invention claimed is:

1. A method of deterring a person from hanging objects on an exposed top surface of a continuous geared door hinge, the [to] *top* surface of the continuous geared door hinge is exposed when the door is closed in a door frame, the door frame [consisting of] *comprising* a header and two side jambs, the continuous geared door hinge is installed between a door and one of the side jambs, the method comprising the step of securely attaching a suitably shaped and sized block to the header to overlay the exposed top surface of the continuous geared door hinge and thereby make the exposed top surface inaccessible for hanging objects.

2. The method of claim 1 further comprising the block is securely affixed to the header with at least one security screw having a head, the block having a downwardly sloping front side with at least one counterbored hole having an opening deep enough so that the head of the at least one security screw does not interfere with the downwardly sloping front side of the block.

3. The method of claim 2 wherein the block further comprises a bottom side sized and shaped to cover an entire portion of the exposed top surface of the continuous geared door hinge when the door is closed in the door frame, a back side perpendicular to the bottom side and the at least one counterbored hole has an axis parallel to the bottom side.

4. The method of claim 1 wherein the continuous geared door hinge is a mortise hinge and the block has one counterbored hole.

5. The method of claim 1 wherein the continuous geared door hinge is a full surface continuous geared door hinge and the block has two counterbored holes.

*6. The method of claim 1 wherein the block includes a bottom surface that is planar and substantially perpendicular to a mounting surface of the header that is engaged by a back side of the block.*

*7. A hinge cap for preventing objects from being supported by an exposed top surface of a continuous geared hinge when a door is closed in a door frame, said hinge cap comprising:*

*a block composed of hard durable material selected from the group consisting of metal, plastic, or fiberglass, the block comprising (i) a back side that is configured to securely attach to a door frame above a continuous geared hinge that supports a door that closes into the door frame, (ii) a bottom side configured to overlay an exposed top surface of the continuous geared hinge and thereby makes the exposed top surface inaccessible for hanging objects, and (iii) a front angled side that extends between a top edge of the back side to a front edge of the bottom side to provide a sloped surface, wherein the block has a counterbored attachment hole that extends through the front angled side and the back side for receiving a fastener that attaches the block to the door frame and does not substantially interfere with the sloped surface of the block.*

*8. The hinge cap of claim 7, wherein the block includes a bottom surface that is generally planar and substantially parallel to an axis of the counterbored attachment hole.*

*9. The hinge cap of claim 7, wherein the sloped surface of the block includes a downward angle of about 45 degrees when measure from the bottom surface.*

*10. The hinge cap of claim 9, wherein the block includes a bottom surface that is planar and substantially perpendicular to the back side of the block.*

* * * * *